Aug. 1, 1967   G. M. LEWIS   3,333,794
GUARDS FOR AIR INTAKES OF JET ENGINES
Filed Aug. 12, 1965   4 Sheets-Sheet 1
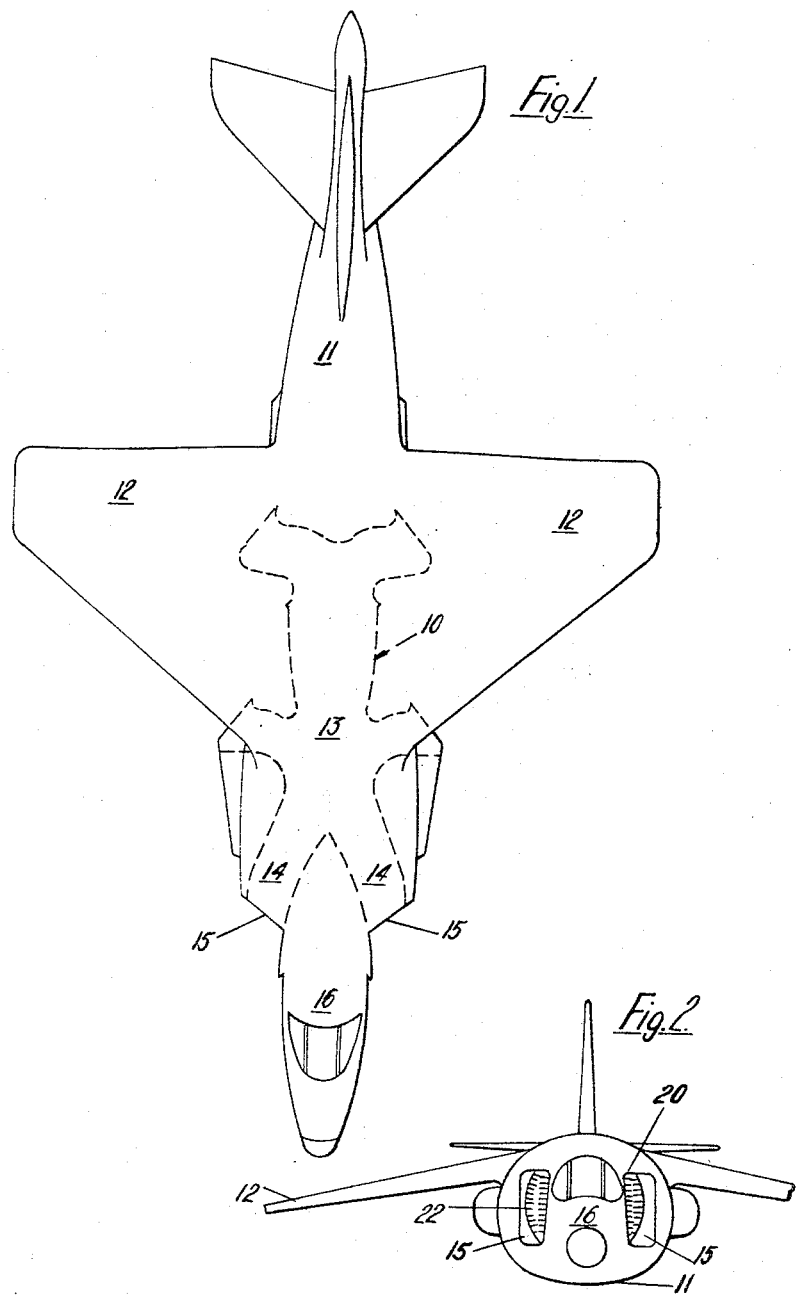
Inventor
GORDON MANNS LEWIS
By
Bailey, Stephens & Huettig
Attorneys

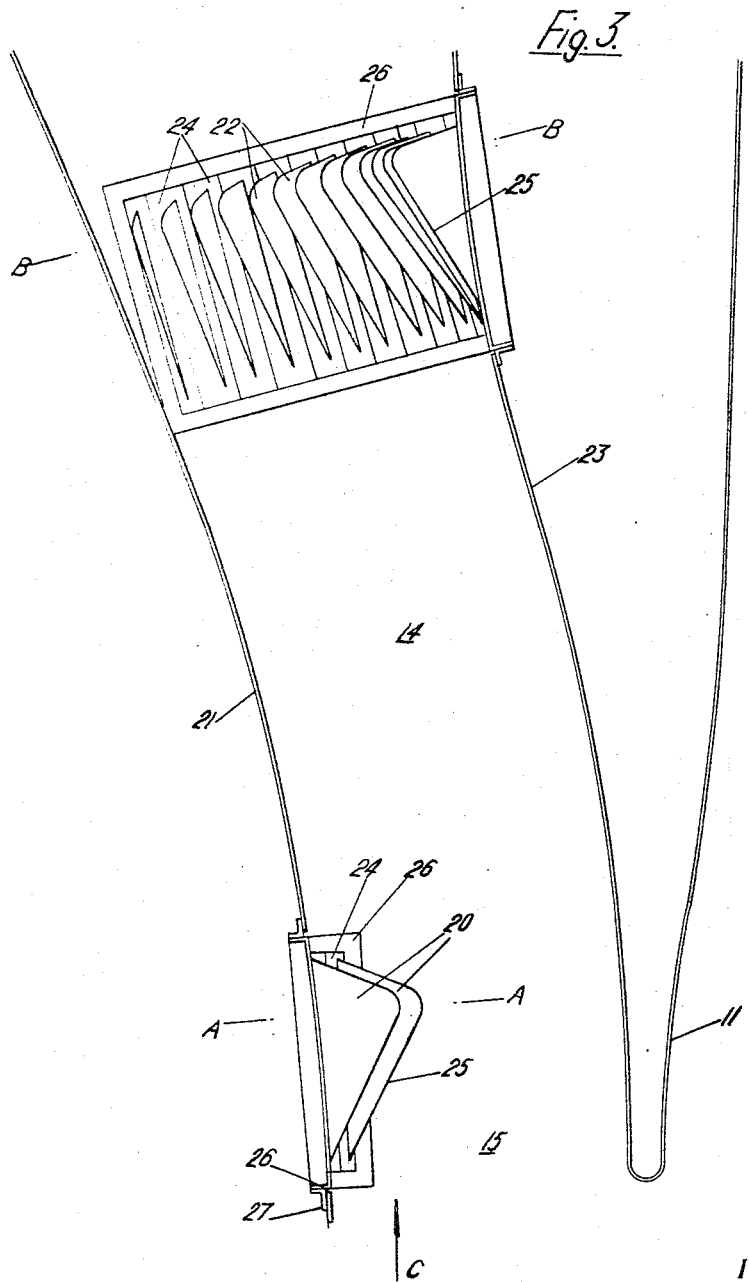

Aug. 1, 1967   G. M. LEWIS   3,333,794
GUARDS FOR AIR INTAKES OF JET ENGINES
Filed Aug. 12, 1965   4 Sheets-Sheet 3
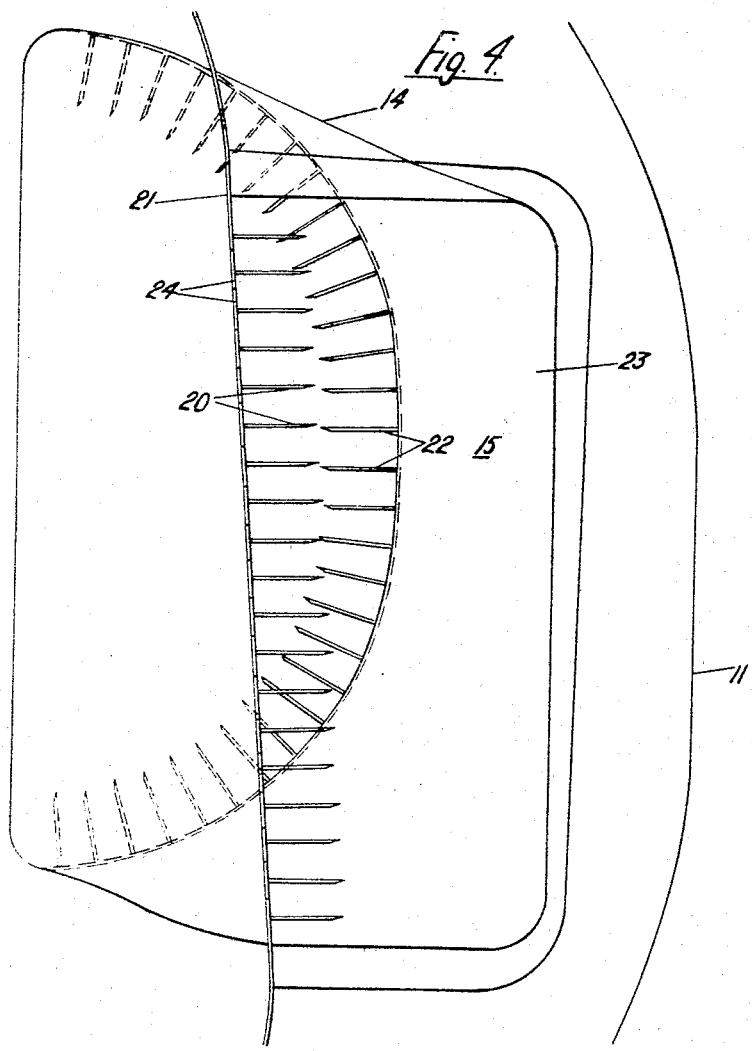
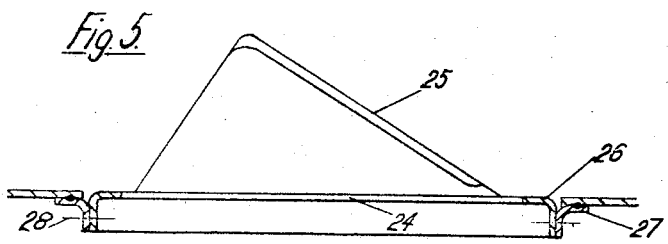
Inventor
GORDON MANNS Lewis
By
Bailey, Stephens & Huettig
Attorneys

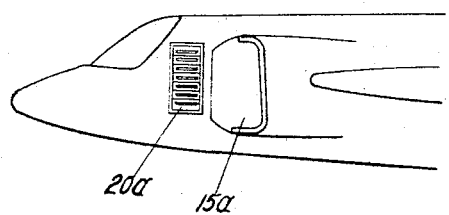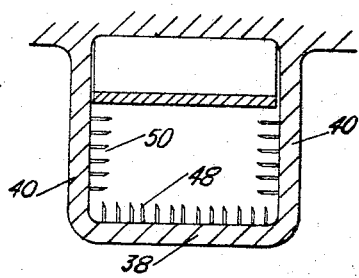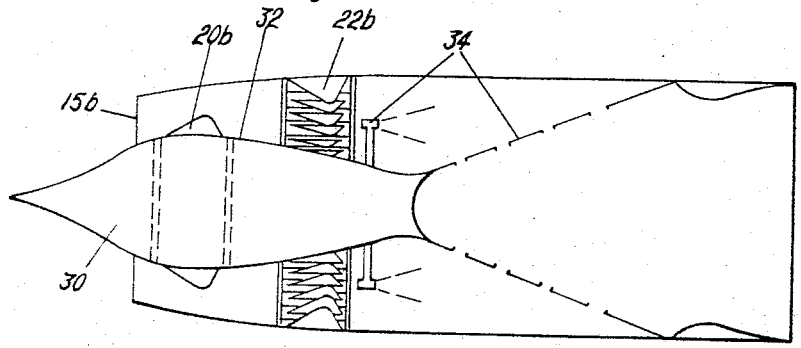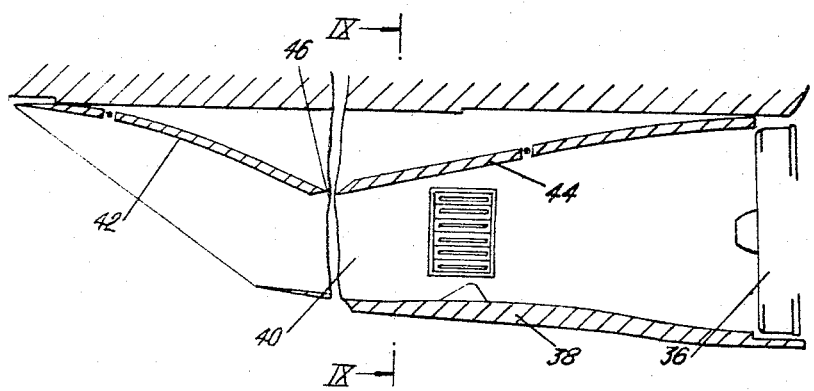

United States Patent Office 3,333,794
Patented Aug. 1, 1967

3,333,794
GUARDS FOR AIR INTAKES OF JET ENGINES
Gordon Manns Lewis, Bristol, England, assignor to Bristol Siddeley Engines Limited, Bristol, England, a British company
Filed Aug. 12, 1965, Ser. No. 479,193
Claims priority, application Great Britain, Aug. 13, 1964, 33,072/64
6 Claims. (Cl. 244—53)

With any air-breathing aircraft engine there is the danger that foreign objects, especially birds, may enter the air intake and damage the engine while the aircraft is in flight or is taking off. If the engine is a gas turbine, the compressor blading may be damaged; if the engine is a ramjet, the combustor equipment may be damaged. The present invention concerns the provision of guards to reduce this danger.

So far as gas turbine engines are concerned, the main purpose of the guard is to intercept any birds which may be encountered when the aircraft is in forward motion before they can reach the engine compressor via the air intake system, and render them at least less capable of damaging the compressor blading, which can be designed to ingest harmlessly small portions of bird.

According to the invention an aircraft having a jet engine with an air intake duct includes a plurality of blades which project partially across the flow of air into or within the intake duct, the blades being spaced apart across the air flow and each presenting a cutting edge to the air flow.

Preferably each blade tapers in thickness to a single upstream edge with a small acute included angle. Alternatively, the blade may present two sharp edges spaced by the thickness of the blade, each having a 90° included angle, but a single sharp edge has better cutting effectiveness, and has much greater resistance to ice build-up.

Each blade may be in the form of a sheet of triangular shape, with its plane parallel to the adjacent air flow, and with one of its sides bearing the cutting edge and inclined to the direction of the adjacent air flow.

The aircraft is preferably provided with an upstream set and a downstream set of cutting blades, which sets project from opposing walls, the location and projection of the blades being such that the sets of blades combine to guard all or nearly all of the cross-sectional area of the intake duct as seen from the approaching air flow.

If the intake duct bends before it reaches the engine, a downstream set of cutting blades may be arranged to project from the wall which is the outer wall of the bend so as better to intercept a bird or other foreign body which has entered the intake duct.

The accompanying drawings show various examples of aircraft according to the present invention. In these drawings:

FIGURES 1 and 2 are diagrammatic plan and front views respectively of an aircraft having a fuselage-housed gas turbine engine which is provided with a pair of lateral forwards-facing air intake ducts;

FIGURE 3 is, on a larger scale, a horizontal section through the port intake duct, and shows two sets of cutting blades;

FIGURE 4 is a combination of two superimposed cross-sections taken along planes A—A and B—B of FIGURE 3, viewed in the direction of the fore-and-aft arrow C in FIGURE 3;

FIGURE 5 is a detail section on a larger scale showing the installation of a cutting blade in the wall of an intake duct;

FIGURE 6 is a fragmentary side elevation of a modification of the aircraft shown in FIGURES 1 and 2;

FIGURE 7 is a diagrammatic longitudinal section of a ramjet engine with an annular intake;

FIGURE 8 is a diagrammatic longitudinal section through an engine intake located beneath a wing; and FIGURE 9 is a section on the line IX—IX in FIGURE 8.

Referring to FIGURES 1 and 2, an aircraft is provided with a gas turbine jet propulsion engine 10 in the fuselage 11 between the wings 12, the compressor casing 13 of the engine communicating upstream with a pair of air intake ducts 14 which converge from their respective forwards-facing intake openings 15 to meet one another at the inlet to the compressor casing 13.

It will be seen that, in forward motion of the aircraft, the air flow for the engine is split at the nose of the fuselage into two parts, each flowing past an adjacent wall of the pilot's cabin 16 to enter an intake duct 14, whence it follows the inwards-bending duct to reach the engine compressor behind the cabin 16.

Referring also to FIGURES 2 to 5, each intake duct 14 is provided with an upstream set of parallel fixed cutting blades 20 which are located on the inner wall 21 of the duct immediately downstream of the opening 15, and a downstream set of fixed cutting blades 22 which are located on the outer wall 23.

The blades 22 are shown as extending radially from an oval wall for clarity, but in practice the duct may have compound curvature, and the blades may be inclined, and even twisted, so as to be parallel with the local air flow. The blades 20 of the upstream set project outwards from the wall 21 whilst the blades 22 of the downstream set project either inwards from the wall 23 or downwards or upwards depending on their position.

Each of the blades 20, 22 is of triangular shape and formed with an oblong foot or root 24 along its base. A suitable material for the blades is stainless steel. Each blade is arranged to extend edge-on to the oncoming air flow so as to present a forward cutting edge 25. This is inclined to the direction of the adjacent air flow, as seen in FIGURE 5, to improve its cutting action should a bird or other object impact against it. The edge 25 is ground, as shown in FIGURE 5, to provide a tapered sharp edge. Extreme sharpness should be avoided since it could cause a bird to be sliced through without separation into pieces. The triangular shape of the blade makes it well able to withstand the shock of any impact, whilst the shape and small frontal area of the blades and the spacing between adjacent blades ensure only slight interference with the air flow.

Adjacent blades in each set are welded together along the abutting longer edges of their roots 24, and each assembly of welded blades is then welded at the shorter edges of the blade roots to the end of one flange of an L-section inner frame 26 which surrounds the blade set. The walls 21, 23 of each intake duct are formed with a slot to receive a framed blade set, the slot-defining edge of each wall being provided with an L-section outer frame 27 (see FIGURE 5) which is spot welded to that surface of the wall which is remote from the duct flow. When the framed blade set is inserted into its slot, the outer frame 27 surrounds the inner frame 26, and the two frames are then detachably secured together, e.g. by bolts which pass through the overlapping flanges of the frames as indicated at 28. The frames 26 and 27 are omitted from FIGURE 4, so as not to obscure other details.

The advantages of this method of installation of the blade sets are that it facilitates the replacement of a blade set if for example a bird strike damages the installed set, and that the blades including their roots may be of similar shape and size, local variations in the curvature of the supporting duct wall being accommodated by varying the L-shape of the inner frame 26.

The spacing of adjacent cutting blades will depend on the estimated size of bird likely to be encountered, and in this example is 2.25 inches. The blades are of sheet, 0.125 inch thick. A wider spacing, say 6.0 inches will involve less obstruction to air flow and less weight, and will still provide significant protection to the engine.

In operation, a bird entering one of the intake ducts 14 will either strike the upstream set of blades 20 or, if it has passed between the latter and the opposing outer wall 23, it will almost certainly strike the downstream set of blades 22. Depending primarily on the relative approach speed of the bird to the blades, either those cutting edges of the blade or blades which intercept the bird will cut through the bird, thus dividing it up into smaller portions, or the bird will collide with the blade and "splodge" on it, being instantly reduced to a glutinous mass including possibly fragments of bone and feathers. Thus the engine compressor blading will receive either sliced portions of bird which, being smaller than the whole bird, are more easily ingested by the ingine with a correspondingly reduced chance of engine damage, or possibly some fragments of bone and feather which may be safely ingested by the engine.

In a modification, shown in FIGURE 6, the upstream set of cutting blades 20a is located a little upstream of the intake duct opening 15a, the framed blade set being detachably mounted from the appropriate side of the pilot's cabin 16.

The invention is applicable to an annular intake, as shown in FIGURE 7, which also illustrates a ramjet engine. Two annular sets of cutting blades 20b, 22b are mounted at upstream and downstream stations, one set 22b projecting inwards from the outer wall of the intake duct and the other set projecting outwards from a centre-body 30 or other structure defining the inner wall 32 of the duct. Alternatively, one set may be just forward of the intake opening 15b. The blades are all upstream of the combustor 34.

Where two sets of cutting blades are provided, the blades of one are preferably staggered with respect to the blades of the other set, as seen looking downstream, thus allowing a wider spacing of the blades in each set to be achieved without a corresponding decrease in the effectiveness of the intake guard. As is apparent from FIGURE 4, this staggering may not be achieved at all places along the sets of blades.

FIGURES 8 and 9 illustrate the application of the invention to an engine housed beneath the wing of a supersonic aircraft. The compressor inlet of the engine is indicated at 36. The intake duct is of rectangular section and is defined by a fixed bottom wall 38 and fixed opposed side walls 40, together with an upper wall constituted by hinged compression and expansion ramps 42 and 44. Boundary layer air is bled off through a gap 46. The bottom wall 38 and the two side walls 40 each carry a set of cutting blades 48 and 50 respectively. For aerodynamic reasons, it is not practical to mount blades on the ramps 42, 44, but the blades 48 and 50 do in fact intersect a large proportion of the air flow, in view of the fact that the ramp 42 deflects the flow downwards towards the bottom wall 38.

I claim:
1. An aircraft having a jet engine with an air intake duct and including a plurality of blades which project partially across the flow of air into or within the intake duct, the blades being spaced apart across the air flow and each presenting a cutting edge to the air flow, said blades including an upstream set and a downstream set of cutting blades, which sets project from opposing walls, the location and projection of the blades being such that the sets of blades combine to guard all or nearly all of the cross-sectional area of the intake duct as seen from the approaching air flow, each set of blades including an assembly of sheet metal cutting blades of triangular shape each having an inclined cutting edge and a foot portion, the blades being spaced apart by their foot portions, the assembly including a frame which holds the foot portions together and is adapted for mounting on a wall.

2. An aircraft according to claim 1, in which the intake duct bends before it reaches the engine and the downstream set of cutting blades projects from the outer wall of the bend.

3. An aircraft according to claim 1, in which blades of one set are staggered with respect to blades of the other set.

4. An aircraft including a jet engine with an intake duct having first and second walls including a first wall which is longitudinally curved, the side of said wall facing the interior of the duct receding from a forward point therof away from the line through such point parallel to the longitudinal axis of the engine, the second wall being opposite the curved wall, and upstream and downstream sets of cutting blades which project one from each of said walls, and terminate a substantial distance short of the other wall, the upstream blades being carried by said curved wall in the area of said point and the downstream blades being spaced along the duct a substantial distance downstream from the upstream blades, the blades of each set being spaced apart transversely of the duct, the location and projection of the blades being such that the sets of blades combine to guard at least nearly all the cross-sectional area of the duct as viewed from upstream.

5. An aircraft according to claim 4, in which each blade is in the form of a sheet of triangular shape with its plane parallel to the adjacent air flow and with one of its sides bearing a cutting edge which is inclined to the direction of the adjacent air flow.

6. An aircraft including a jet engine with an intake duct having first and second walls including a first wall which is longitudinally curved, the side of said wall facing the interior of the duct receding from a forward point thereof away from the line through such point parallel to the longitudinal axis of the engine, the second wall being opposite the curved wall, and upstream and downstream sets of cutting blades which project one from each of said walls, and terminate a substantial distance short of the other wall, the upstream blades being carried by said curved wall in the area of said point and the downstream blades being spaced along the duct a substantial distance downstream from the upstream blades, the blades of each set being spaced apart transversely of the duct, the blades of each row projecting less than halfway across the duct but the rows of blades being so located along the duct that when viewed from upstream the rows cooperate to form a guard which extends substantially entirely across the duct.

References Cited
UNITED STATES PATENTS

| | | | |
|---|---|---|---|
| 2,534,138 | 12/1950 | Marshall | 55—306 X |
| 2,733,000 | 1/1956 | Sparklin | 103—111 X |
| 2,738,029 | 3/1956 | Battle et al. | |
| 3,096,718 | 7/1963 | Anderson | 103—111 |
| 3,104,522 | 9/1963 | Pennington et al. | |

FOREIGN PATENTS

| | | |
|---|---|---|
| 226,319 | 1/1960 | Australia. |
| 751,416 | 9/1933 | France. |
| 960,112 | 1/1950 | France. |

MILTON BUCHLER, *Primary Examiner.*

B. BELKIN, *Assistant Examiner.*